United States Patent [19]

Berg et al.

[11] Patent Number: 5,149,553
[45] Date of Patent: Sep. 22, 1992

[54] BEER PROCESSING AND COMPOSITION

[75] Inventors: Kenneth A. Berg, North Wales; Reinhard H. Witt, Wyncote; M. Robert Derolf, Pottstown, all of Pa.

[73] Assignee: PQ Corporation, Valley Forge, Pa.

[21] Appl. No.: 700,205

[22] PCT Filed: Oct. 11, 1990

[86] PCT No.: PCT/US90/05858

§ 371 Date: Jun. 6, 1991

§ 102(e) Date: Jun. 6, 1991

Related U.S. Application Data

[63] Continuation-in-part of Ser. No. 420,502, Oct. 12, 1989, abandoned.

[51] Int. Cl.$^5$ .............................................. C12H 1/04
[52] U.S. Cl. ................................. 426/330.4; 426/423
[58] Field of Search .............................. 426/330.4, 423

[56] References Cited

U.S. PATENT DOCUMENTS

| H89 | 7/1986 | Harville | 426/330.5 |
|---|---|---|---|
| 3,436,225 | 4/1969 | Reuble | |
| 3,800,031 | 3/1974 | Sale | 423/338 |
| 3,818,111 | 6/1974 | Hoover | 426/442 |
| 3,878,300 | 4/1975 | Milligan | 426/16 |
| 3,903,316 | 9/1975 | Hoover | 426/16 |
| 4,027,046 | 5/1977 | Bohm | 426/330.3 |
| 4,142,968 | 3/1979 | Nielsen | 210/32 |
| 4,187,174 | 2/1980 | Nielsen | 210/32 |
| 4,279,879 | 7/1981 | Winyall | 423/338 |
| 4,303,641 | 12/1981 | De Wolf | 423/339 |
| 4,474,824 | 10/1984 | De Wolf | 423/339 |
| 4,508,742 | 4/1985 | McLaughlin | 426/330.4 |
| 4,797,294 | 1/1989 | Berg | 426/330.4 |
| 4,880,650 | 11/1989 | Okamura | 426/330.3 |
| 4,889,743 | 12/1989 | Tazawa | 426/330.4 |
| 4,975,405 | 12/1990 | Okamura | 502/233 |

Primary Examiner—Carolyn Paden
Attorney, Agent, or Firm—Ernest G. Posner

[57] ABSTRACT

A composition that provides improved chillproofing of beer and other beverages is disclosed. The composition comprises a silica gel reacted with a metal, said metal having the capability of being sorbed and desorbed from the silica gel in response to pH and concentration changes.

25 Claims, No Drawings

BEER PROCESSING AND COMPOSITION

This application is a Continuation-in-Part of applicants' co-pending U.S. patent application Ser. No. 7/420,502, filed Oct. 12, 1989, now abandoned.

BACKGROUND OF THE INVENTION

Compositions comprising silica gel reacted with metal ions provide improved chillproofing and processing of beer and other brewed beverages. The compositions provide processing advantages with most beers but are especially useful in treating the so-called high malt beer and other beers that are known to be difficult to chillproof.

The term "beer," as used in this specification and claims, includes many types of brewed beverages. Such beverages include lager, Pilsner, Dortmund and Munich beers. Other such beverages are ale, porter and stout.

Beer and other beverages brewed from grains are complex solutions containing numerous organic solutes. Some of these compounds undergo reactions depending on how and how long the beverage is stored. One troubling reaction is the development of haze on aging and chilling. This haze is objectionable to consumers of the beverage.

A number of methods and products have been developed to remove sufficient of the haze former to prevent its formation. These methods or products are used before bottling and include the use of various adsorbents such as silica hydrogels and/or xerogels; calcium, aluminum and magnesium silicates; several types of clays or minerals; and mixtures thereof. U.S. Patents that disclose such art include U.S. Pat. Nos. 3,163,538; 3,251,693; 3,436,225; 3,617,301; 3,940,498; and 3,958,023. U.S. Pat. No. 4,797,294 discloses a combination of silica gel and magnesium silicate as an effective chillproofer for some beers.

Not all beers are equally easy to stabilize against chill haze formation. Sfat, "MBAA Technical Quarterly" 12, 4,243-248 (1975), teaches that some beers can be stabilized with 1 to 2 pounds of polyvinylpolypyrollidone (PVPP) and 3 to 4 pounds of silica gel for each 100 bbls of beer. More difficult beers require 3 to 4 pounds of PVPP and 3 to 4 pounds of silica hydrogel for each 100 bbls of beer for effective stabilization.

It is an object of this invention to provide a chillproofing agent that is effective in beers that are difficult to treat and that can be used with shorter contact times or in lower doses for beers that are easier to chillproof. It is also an objective of this invention to provide a method and product that do not involve PVPP in chillproofing higher malt beers.

SUMMARY OF THE INVENTION

The chillproofing composition of our invention is prepared by reacting certain alkaline silica gels with metals. Such compositions are exceptionally effective in chillproofing all beers, but are especially useful for beers which have previously required a combination of silica gel and PVPP to stabilize. The metal ion is reacted with or sorbed on the silica gel to provide a uniform distribution of the metal in the pores and on the surface of the silica.

The composition of our invention is added to the beer before bottling. Contact continues for a time sufficient to adsorb the chill haze components and provide the degree of stabilization required. Use of the composition of our invention allows processing of most beers at lower dosages or at shorter contact times than required when silica hydrogel is used. High malt beers can be processed without the use of PVPP.

The increased chillproofing activity of the product made by our process has not been predicted by the prior art that discloses various siliceous agents that contain metals. The prior art discloses blends of silica gel and magnesium silicate which have only slightly higher chillproofing activity than silica gel alone in difficult to stabilize high malt beers. Our product, which contains sorbed or exchanged multivalent ions, is extremely efficient in chillproofing such beers. Indeed, the metal must be introduced into our products as described, as other ways of providing metal do not provide the desired chillproofing activity. If a silica gel suspended in a solution of metal salt is used for chillproofing, the desirable behavior of our product is not realized. If a metal silicate is introduced into a silica hydrosol, the chillproofing activity of the resulting gel is lost.

THE INVENTION

The composition of our invention is a silica gel wherein metals, especially those with multivalent ions, are reacted with or sorbed on the gel. Our composition is characterized by a uniform distribution of the metal in the pores and on the surface of the silica. Our composition is further distinguished in that the metal is not in the form of large precipitates of metal oxide that block the pores of the silica, nor is metal oxide precipitated around the particles of silica.

The first step in forming the composition of our invention is the partial neutralization of a sodium silicate or potassium silicate solution to form a silica hydrosol. We prefer to neutralize 60 to 85% of the alkali metal present in the silicate solution. A most preferred embodiment is to neutralize 70 to 80% of the alkali metal in the silicate solution. This hydrosol is allowed to set to a hydrogel. The hydrogel is slurried with a solution of a salt of a multivalent metal and an acid, the pH and concentration of said solution being such that the metal reacts readily with the silica hydrogel, but does not precipitate. The silicate may be completely neutralized or induced to gel with an excess of acid and washed if the gel is adjusted to an alkaline pH prior to treating with the metal solution.

Multivalent metals used to prepare the compositions of our invention are those which can react with the silica surface in a reversible manner. In other words, the metal ion must be capable of sorbing or desorbing from silica in response to changes in pH and/or concentration. Among useful metals are aluminum, calcium, magnesium, nickel, barium, manganese, copper and mixtures thereof. The metal can exist in the solution as the ionized form of a metal salt. The metal can also be present as a complex. We use halides, phosphates, nitrates, sulfates, acetates or oxalates as counter ions to the metal ions in solution. The concentration of the metal ion in solution should be sufficient to promote reaction of the metal with the silica but not favor precipitation or aggregation of metal species. The concentration of the metals as the ion should be more than about 0.3% by weight but less than about 10% by weight. We prefer 3 to 7% by weight.

The pH of the metal ion solution must be controlled and may be adjusted during the reaction of the metal with the silica, and the pH-adjusting agent may be any that can achieve and maintain the required pH value in solution while the solution is exposed to silica. Acids, bases and various buffers can be used. For most metals the pH should be maintained at a value of about 7 to 10.5; we prefer 8 to 9.5.

The reacted gel is separated from the spent solution by any convenient method. The product is washed to reduce salt concentration. The product is then dried and milled to finish the process.

The preparation of our product can be described in further detail with magnesium as the metal. Silica hydrosols are prepared by simultaneously and instantaneously mixing aqueous solutions of acid and sodium silicate. The concentrations and flow rates or proportions are adjusted so that the hydrosol contains 8 to 12% $SiO_2$ and so that only 60 to 85% of the sodium is neutralized. Such hydrosols gel rapidly and can be allowed to gel in a mass and then crushed to form particles for further processing. In one embodiment the hydrosol contains about 10% $SiO_2$, has a pH above about 8 and gel in a matter of seconds or less. Such a hydrosol can be formed into spheres by spraying in air.

The gel particles are contacted with an aqueous solution of a magnesium salt such as $MgSO_4$ for a period of time sufficient to replace the unreacted sodium on the surface of the silica with magnesium. The contact time can be 1 to 6 hours. The gel is then washed, dried and milled to provide the desired moisture level and particle size. The particle size should average 10 to 40 microns.

Another process embodiment of the process to prepare the product of our invention involves the preparation of a silica gel wherein the hydrosol has a neutral or acid pH value. Sufficient or more than sufficient acid is added to neutralize all of the sodium present in the silicate. The resulting gel is washed to remove some salts and excess acid. Then an alkaline solution such as NaOH is added to the silica gel slurry to provide a pH above about 8, preferably between about 8.3 and 9. This alkalized or alkaline gel is contacted with a solution of a metal salt such as magnesium sulfate for a time sufficient to exchange and/or react the magnesium on the silica surface in place of the sodium.

In the preferred embodiment of our invention, the exchanged or reacted silica gel is dried. In another embodiment of our invention the exchanged or reacted gel can be used without drying or can be partially dried.

The product of our invention comprises a silica gel reacted with a metal, usually a metal with a valence of 2 or more. The metal is apparently distributed uniformly from the center of each particle or granule to the surface, and it is not in the form of a large metal oxide precipitates either in the pores or around the particles. The amount of metal reacted varies, but should be more than 0.65% wt/wt. The product can contain 5 to 60% moisture with the balance being $SiO_2$. A preferred product of our invention has the following composition:

|  | % by Weight |
| --- | --- |
| Metal | 0.7–15.0 |
| $SiO_2$ | 60.0–94.0 |
| $H_2O$ | 5.0–25.0 |

Our most preferred metal ion is magnesium, and we prefer to have about 1 to 5% present as Mg.

The first advantage of the product of our invention is exceptionally efficient chillproofing of beer and brewed beverages. In one experiment a commercially available silica hydrogel beer clarifier required sufficient product to yield 1500 ppm of $SiO_2$ to provide a chill haze reading after forcing of 38 ASBC FTU. A composition of our invention containing magnesium provided an FTU reading of 23 at only 600 ppm of solids. To chillproof beer, 200 to 1500 ppm of the composition of our invention is introduced into the beer and allowed to contact the beer for a sufficient time to remove the chill haze elements. The spent composition is removed and the beer is now stabilized.

A second advantage of the product of our invention is that it can chillproof beers that cannot be stabilized by any dosage of silica gel alone. The dosage of our product required for these beers is not in excess of the usual 200 to 1500 ppm recited previously. Another advantage of our product is its rate of action. Our product chillproofs faster than silica hydrogel, as shown in Example 6.

Numerous methods of providing a combination of metals with silica gel to the chillproofing process have not provided behavior even approaching the efficiency of the product made by our process. A suspension of silica gel in a solution of magnesium sulfate does not exhibit the activity of our composition. For details see Example 4. Blends of magnesium silicate and silica gel have only slightly improved chillproofing activity when compared with silica gel alone, when used in high malt, difficult to chillproof beers. Our product provides much improved performance over a commercial silica hydrogel as is shown Example 2. Silica gel made with magnesium silicate fed to the hydrosol prior to gelling is actually inferior to silica gel in chillproofing activity.

EXAMPLES

The following examples illustrate certain embodiments of our invention. These examples are not provided to establish the scope of the invention, which is described in the disclosure and recited in the claims. The proportions are in parts by weight (pbw) or percent by weight (% wt/wt) unless otherwise indicated.

Our chillproofing experiments were carried out as follows. Untreated beer was refrigerated at 0° C. during storage and handling, and protected against oxygen by $CO_2$. The headspace $O_2$ level was less than 100 ppb during all handling. Time contact with the chillproofing agent started when an aliquot of beer was transferred into a tank containing a stirred deoxygenated slurry of chillproofer. The slurry contained 10% (w/v) chillproofing agent, and the volume was varied to provide the dose of agent desired. After the required contact time the beer slurry was pumped through a filter. After filtering, the beer was bottled anaerobically against $CO_2$ back pressure. The bottled beer was forced by incubation at 60° C. for 5 days; then it was stored at 0° C. for 2 days.

The haze was measured with an LG Automatic Haze Meter filled with ice water. The units are ASBC FTU. The instrument is standardized each day using membrane filtered water and a 431 FTU standard.

EXAMPLE 1

A silica hydrosol containing 10% $SiO_2$ was prepared by instantaneously mixing solution of sulfuric acid and sodium silicate. The acid solution contained 19.71% $H_2SO_4$. The silicate solution has 3.17 Pbw of $SiO_2$ for each pbw of $Na_O$ and contained 16.05% solids. The flow rates to the nozzle mixer were such that the hydrosol contained 10% $SiO_2$, 75% of the sodium in the silicate was neutralized, and the pH was above about 8. The hydrosol was sprayed into the air and allowed to form into spheres. The gel time was less than one second.

The gelled spheres were introduced into an aqueous solution of magnesium sulfate. The sulfate solution contained 5% $MgSO_4$ and upon addition of the silica gel had a pH of about 8.5 which persisted during the three hour contact time. The reacted gel was washed three times with deionized water to remove the sodium salts formed and the residual magnesium sulfate salts. The volume of water used in each wash step equaled the volume of the reacted gel. The gel was dried to a loss on drying (LOD) of 15% and milled to an average particle size of 17 microns. The product contained 2.5% MgO which is equivalent to the sodium which was not neutralized.

EXAMPLE 2

The product produced as described in Example 1 and silica hydrogel, a commercially accepted chillproofing agent, were tested for chillproofing activity in a difficult to chillproof 80% malt beer.

TABLE 1

| | Chill Haze After Forcing (ASBC FTU) | |
|---|---|---|
| Dose (ppm) | Product Example 1 | Commercial Silica Hydrogel |
| None | 425 | 425 |
| 200 | 200 | 240 |
| 400 | 140 | 210 |
| 600 | 95 | 150 |
| 800 | 85 | 140 |

A chill haze of 100 FTU is often a goal which is believed to provide desirable stability for beer. These results indicate that 100 FTU can be achieved by a reasonable dose of our product, 600 ppm. The commercial hydrogel did not provide such a reading even at a dose of 800 ppm.

EXAMPLE 3

The product of Example 1 and the commercial silica hydrogel were tested in a less difficult-to-chillproof 70% male beer.

TABLE 2

| | Chill Haze After Forcing (ASBC FTU) | |
|---|---|---|
| Dose (ppm) | Product Example 1 | Commercial Silica Hydrogel |
| 0 | 495 | 495 |
| 200 | 140 | 190 |
| 400 | 90 | 160 |
| 600 | 80 | 100 |
| 800 | 78 | 100 |

These results also indicate the efficiency of our product in providing a FTU of 100 or less. Our product requires less than 400 ppm to achieve 100 FTU, while the commercial silica hydrogel requires 600 ppm.

EXAMPLE 4

The product of our invention as described in Example 1 was tested and compared with silica gel and a silica gel suspended in a solution of $MgSO_4$. Sufficient $MgSO_4$ was used to provide the same level of Mg that is provided by the product of our invention. The 80% malt beer was treated with 778 ppm of each agent. The results are summarized in the following table.

TABLE 3

| Treatment Agent | Chill Haze After Forcing (ASBC FTU) Forced Chill Haze |
|---|---|
| None | 777 |
| Silica Hydrogel | 330 |
| Silica Gel + $MgSO_4$ | 323 |
| Product of Example 1 | 206 |

These results indicate that the silica gel suspended in a solution of $MgSO_4$ provided about the same chillproofing 70% performance as did the silica gel. The product of our invention provided significantly better chillproofing performance.

EXAMPLE 5

A product similar to that described in Example 1 was prepared with calcium as the metal. Nitric acid was substituted for the sulfuric acid and the gel contained 10% $SiO_2$. Twenty-five percent (25%) of the sodium was unneutralized. The gel was contacted with a solution of 0.5 molar calcium nitrate. The other steps remained the same. It was tested with the product of Example 1 and silica gel in a difficult-to-chillproof beer with 70% malt. The results are summarized in the following table.

TABLE 4

| | Chill Haze After Forcing (ASBC FTU) | | |
|---|---|---|---|
| Dose (ppm) | Product Example 1 | Product Example 5 | Silica Gel |
| 0 | 279 | 279 | 279 |
| 400 | 98 | 95 | — |
| 600 — | 89 | 93 | |

These results with others show that the products made by our process can achieve the desired reading of 100 FTU at a dose of about 400 ppm.

EXAMPLE 6

The product of our ,invention as described in Example 1 (400 ppm) and a silica hydrogel (400 ppm) were used to stabilize beer with 80% malt. The FTU readings for various total contact times are summarized in the following Table.

TABLE 5

| | Chill Haze After Forcing (ASBC FTU) | |
|---|---|---|
| Total Contact Time (Minutes) | Silica Gel | Product of Example 1 |
| 0 | 402 | 402 |
| 2.08 | — | 270 |
| 2.77 | 322 | — |
| 2.82 | 346 | — |
| 3.41 | — | 200 |
| 6.18 | — | 209 |
| 6.86 | 273 | — |
| 11.53 | 232 | — |
| 11.96 | — | 174 |

These results indicate that our product is very effective in short contact times. Our product provides an FTU reading of 270 in about 2 minutes while the silica gel requires about 7 minutes to provide the same reading.

We claim:

1. A composition for treating beer to prevent chill haze, said composition comprising a silica gel reacted with a multivalent metal ion and being characterized by a uniform distribution of the metal in the pores and on the surface of the silica, and wherein said multivalent metal is not precipitated in the pores of the silica or around the particles of silica, said composition being prepared by the steps of:

a. combining a solution of sodium silicate or potassium silicate with a solution of an acid to form a silica hydrosol, the composition and proportions of said silicate and acid solution being such that 60 to 85% by weight of the sodium or potassium in the silicate solution is neutralized and the hydrosol contains 8 to 12% by weight $SiO_2$;
 b. allowing said hydrosol to set to a hydrogel;
 c. granulating said hydrogel into discrete particles;
 d. contacting said hydrogel particles with a solution of 3 to 10% by weight of a salt of a multivalent metal and maintaining the pH of the mixture of hydrogel and solution at a value of about 7 to 10.5, whereby the metal reacts or exchanges with the silica but large precipitates of hydrous metal oxide do not form within the pores of the silica or around the silica particles;
 e. maintaining contact between the hydrogel particles and metal salt solution until the desired level of metal is reacted or exchanged with the silica;
 f. washing the reacted silica
 g. drying and milling the reacted silica; and
 h. recovering the product silica.

2. The composition of claim 1 wherein the silicate is sodiumsilicate and the proportion of silicate and acid solutions are such that 70 to 80% of the sodium is neutralized.

3. The composition of claim 2 wherein the metal is magnesium or calcium.

4. The composition of claim 2 wherein the $SiO_2$ is about 60 to 94% by weight, the metal is about 0.7 to 15.0% by weight and the water is about 5 to 25% by weight.

5. The composition of claim 4 wherein the metal is magnesium or calcium.

6. The composition of claim 2 wherein the silica has reacted thereon at least 0.65% by weight of the multivalent metal.

7. A composition for treating beer to prevent chill haze, said composition comprising a silica gel reacted with a metal ion and being characterized by a uniform distribution of the metal in the pores and on the surface of the silica, and wherein said multivalent metal is not precipitated in the pores of the silica or around the particles of silica, said composition being prepared by the steps of:

a. combining a solution of sodium silicate or potassium silicate with a solution of an acid to form a silica hydrosol, the composition and proportions of said silicate and acid solution being such that at least sufficient acid is present to neutralize all of the sodium or potassium in the silicate solution;
 b. allowing said solution to set to a hydrogel;
 c. granulating said hydrogel into discrete particles;
 d. washing said gel;
 e. adjusting the pH of said washed gel to an alkaline value.
 f. contacting said hydrogel particles with a solution of 3 to 10% by weight of a salt of a multivalent metal and maintaining the pH of the mixture of hydrogel and solution at a value of about 7 to 10.5, whereby the metal reacts or exchanges with the silica but large precipitates of hydrous metal oxide do not form within the pores of the silica or around the silica particles;
 g. maintaining contact between the hydrogel particles and metal salt solution until the desired level of metal is reacted or exchanged with the silica;
 h. washing the reacted silica;
 i. drying and milling the reacted silica; and
 j. recovering the product silica.

8. The composition of claim 7 wherein the silica has reacted thereon at least 0.65% by weight of the multivalent metal.

9. The composition of claim 7 wherein the metal is magnesium or calcium.

10. The composition of claim 7 wherein the $SiO_2$ is about 60 to 94% by weight, the metal is about 0.7 to 15.0% by weight and the water is about 5 to 25% by weight.

11. The composition of claim 10 wherein the metal is magnesium or calcium.

12. A method to treat beer to prevent chill haze comprising contacting said beer with 200 to 1500 parts per million (ppm) of metal reacted silica gel for a time sufficient to remove chill haze components from the beer and then separating the composition from the beer wherein said metal reacted silica is prepared by the steps of:

a. combining a solution of sodium silicate or potassium silicate with a solution of an acid to form a silica hydrosol, the composition and proportions of said silicate and acid solution being such that 60 to 85% by weight of the sodium or potassium in the silicate solution is neutralized and the hydrosol contains 8 to 12% by weight $SiO_2$;
 b. allowing said hydrosol to set to a hydrogel;
 c. granulating said hydrogel into discrete particles;
 d. contacting said hydrogel particles with a solution of 3 to 10% by weight of salt of a multivalent metal and maintaining the pH of the mixture of hydrogel and solution at a value of about 7 to 10.5, whereby the metal reacts or exchanges with the silica but large precipitates of hydrous metal oxide do not form within the pores of the silica or around the silica particles;
 e. maintaining contact between the hydrogel particles and metal salt solution until the desired level of metal is reacted or exchanged with the silica;
 f. washing the reacted silica;
 g. drying and milling the reacted silica; and
 h. recovering the product silica.

13. The method of claim 12 wherein the silicate is sodium silicate and the proportion of silicate and acid solutions are such that 70 to 80% of the sodium is neutralized.

14. The method of claim 13 wherein the silica has reacted thereon at least 0.65% by weight of the multivalent metal.

15. The method of claim 13 wherein the metal is magnesium or calcium.

16. The method of claim 13 wherein the metal reacted silica contains 60 to 94% by weight $SiO_2$, about 0.7 to 15.0% by weight metal and about 5 to 25% by weight water.

17. The method of claim 16 wherein the metal is magnesium and the beer contains at least 70% malt.

18. A method to treat beer to prevent chill haze comprising contacting said beer with 200 to 1500 parts per million (ppm) of metal reacted silica gel for a time sufficient to remove chill haze components from the beer and then separating the composition from the beer wherein said metal reacted silica is prepared by the steps of:
   a. combining a solution of sodium silicate or potassium silicate with a solution of an acid to form a silica hydrosol, the composition and proportions of said silicate and acid solution being such that at least sufficient acid is present to neutralize all of the sodium or potassium in the silicate solution;
   b. allowing said hydrosol to set to a hydrogel;
   c. granulating said hydrogel into discrete particles;
   d. washing said gel;
   e. adjusting the pH of said washed gel to an alkaline value;
   f. contacting said hydrogel particles with a solution of 3 to 10% by weight of a salt of a multivalent metal and maintaining the pH of the mixture of hydrogel and solution at a value of about 7 to 10.5, whereby the metal reacts or exchanges with the silica but large precipitates of hydrous metal oxide do not form within the pores of the silica or around the silica particles;
   g. maintaining contact between the hydrogel particles and metal salt solution until the desired level of metal is reacted or exchanged with the silica;
   h. washing the reacted silica;
   i. drying and milling the reacted silica; and
   j. recovering the product silica.

19. The method of claim 18 wherein the silica has reacted thereon at least 0.65% by weight of the multivalent metal.

20. The method of claim 18 wherein the metal is magnesium or calcium.

21. The method of claim 18 wherein the metal reacted silica contains about 60 to 94% by weight $SiO_2$, about 0.7 to 15% by weight metal and about 5 to 25% by weight water.

22. The method of claim 21 wherein the metal is magnesium and the beer contains at least 70% malt.

23. A composition for treating beer to prevent chill haze, said composition comprising a silica gel reacted with a multivalent metal ion, being characterized by a uniform distribution of the multivalent metal in the pores and on the surface of said silica gel and wherein said metal is not precipitated in the pores of said silica gel or around the particles of said silica gel, and being further characterized as comprising 60 to 94% by weight $SiO_2$, 0.7 to 15% by weight said multivalent metal and 5 to 25% by weight water.

24. The composition of claim 23 wherein the silica gel has reacted thereon at least 0.65% by weight of said multivalent metal.

25. The composition of claim 24 wherein the metal is magnesium.

* * * * *